US010910963B2

(12) United States Patent
Ponce et al.

(10) Patent No.: US 10,910,963 B2
(45) Date of Patent: Feb. 2, 2021

(54) POWER STEALING SYSTEM WITH AN ELECTRIC LOAD

(71) Applicant: Ademco Inc., Golden Valley, MN (US)

(72) Inventors: Jesus Omar Ponce, Chihuahua (MX);
Arturo Romero, Chihuahua (MX);
Jonathan Lopez, Brno-jih-Komárov (CZ)

(73) Assignee: Ademco Inc., Golden Valley, MN (US)

( * ) Notice: Subject to any disclaimer, the term of this patent is extended or adjusted under 35 U.S.C. 154(b) by 229 days.

(21) Appl. No.: 16/047,344

(22) Filed: Jul. 27, 2018

(65) Prior Publication Data

US 2020/0036304 A1     Jan. 30, 2020

(51) Int. Cl.
| | | |
|---|---|---|
| *H02N 99/00* | (2006.01) | |
| *H02M 7/06* | (2006.01) | |
| *F25B 49/02* | (2006.01) | |
| *G05F 1/46* | (2006.01) | |

(52) U.S. Cl.
CPC .............. *H02N 99/00* (2013.01); *H02M 7/06* (2013.01); *F25B 49/022* (2013.01); *F25B 2600/0252* (2013.01); *F25B 2600/0253* (2013.01); *G05F 1/46* (2013.01)

(58) Field of Classification Search
None
See application file for complete search history.

(56) References Cited

U.S. PATENT DOCUMENTS

| | | | |
|---|---|---|---|
| 9,702,579 B2 | 7/2017 | Warren et al. | |
| 9,746,859 B2 | 8/2017 | Conner et al. | |
| 9,766,606 B2 | 9/2017 | Fadell et al. | |
| 2004/0257844 A1* | 12/2004 | Chen | H02M 7/06 363/125 |
| 2009/0067207 A1* | 3/2009 | Nishino | H02M 7/08 363/126 |
| 2015/0115887 A1* | 4/2015 | Hung | H02J 5/00 320/109 |

FOREIGN PATENT DOCUMENTS

WO     2016182434 A1     11/2016

* cited by examiner

*Primary Examiner* — Jared Fureman
*Assistant Examiner* — Aqeel H Bukhari
(74) *Attorney, Agent, or Firm* — Shumaker & Sieffert, P.A.

(57) ABSTRACT

A power stealing system having an electrical load, a capacitive element having an input connected to the electrical load. Some power from the electrical load may go through the capacitive element to an input of a rectifier. A voltage regulator may have an input connected to an output of the rectifier to set and control a voltage level of the electrical power from the rectifier, and provide an output of power stolen from the electrical load. An amount of power flowing through the capacitive element may be less than one percent of power flowing through the electrical load.

20 Claims, 5 Drawing Sheets

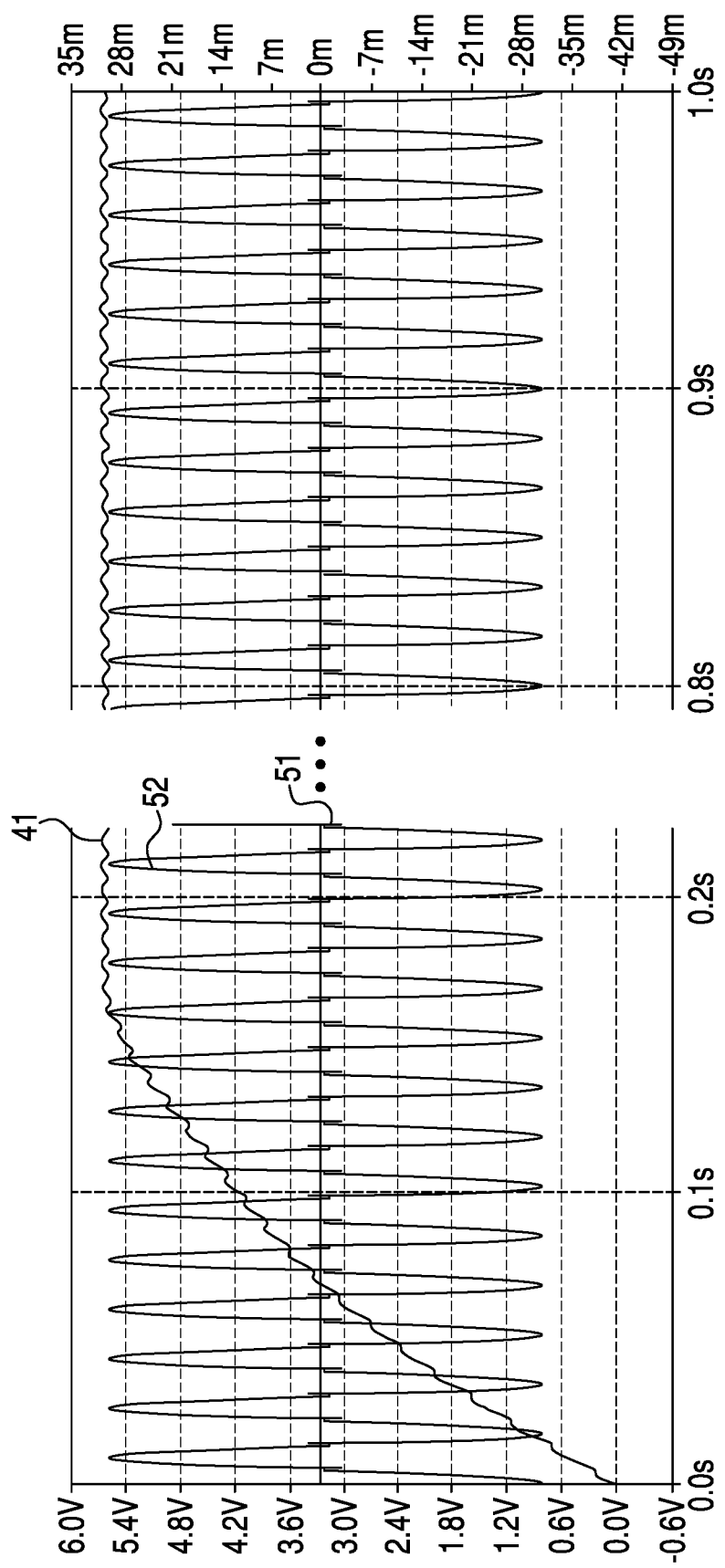

POWER STEALING SYSTEM WITH AN ELECTRIC LOAD

BACKGROUND

The present disclosure pertains to electrical power sources and transformation of electrical power.

SUMMARY

The disclosure reveals a power stealing system having an electrical load, a capacitive element having an input connected to the electrical load. Some power from the electrical load may go through the capacitive element to an input of a rectifier. A voltage regulator may have an input connected to an output of the rectifier to set and control a voltage level of the electrical power from the rectifier, and provide an output of power stolen from the electrical load. An amount of power flowing through the capacitive element may be less than one percent of power flowing through the electrical load.

BRIEF DESCRIPTION OF THE DRAWING

FIGS. 3 through 5 are diagrams of waveforms representing several conditions of the power stealing.

DESCRIPTION

Figure 1:
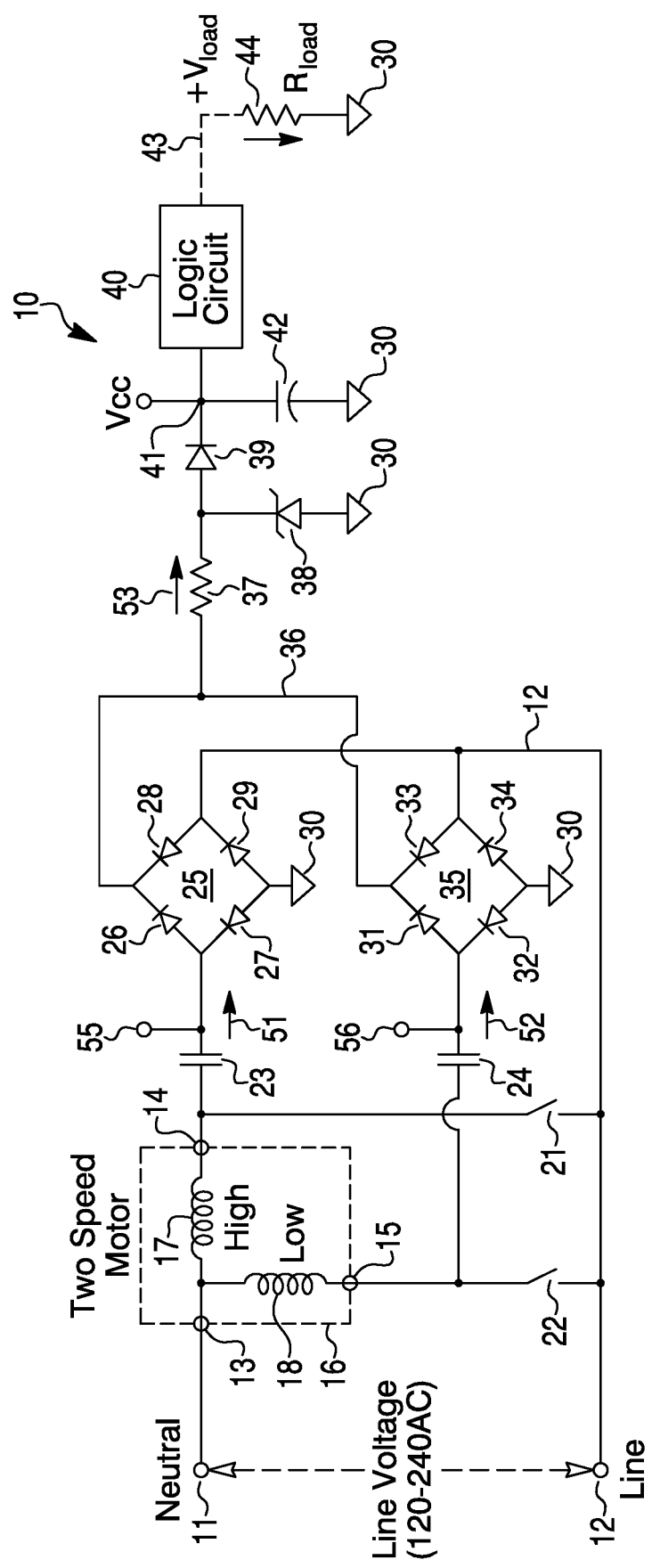
FIG. 1 is a diagram of a circuit of a power stealing AC motor.

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Aspects of the system or approach may be described in terms of symbols in the drawing. Symbols may have virtually any shape (e.g., a block) and may designate hardware, objects, components, activities, states, steps, procedures, and other items.

An electronic control may be designed for energizing an evaporative cooler using the existing wire system installation into the building (four wires: line, high speed, low speed, and pump). This kind of evaporative cooler thermostat does not necessarily appear in the market; however, competitors' devices may require a modification to the building for such a system to be installed.

First, the present system may allow one to energize an electronic control logic to be used in existing evaporative air installations (i.e., a four wire system) without the need to install an additional wire (i.e., a five wire system) as competitive products may require. Second, the benefits may include, but are not limited to, low heat dissipation, and no extra cost associated with evaporative air thermostat installation. Third, there may be an opportunity to introduce to the market a new thermostat for an evaporative air controller with an initial EAV of 15K.

The system may consist of connecting class X2 rated capacitors in series with each winding of a two-speed motor (i.e., each winding is structured for a particular motor speed) in order to create a voltage drop across the capacitors. An output circuit may consist of two full-wave rectifiers as well as one or more linear regulators to accommodate the voltage supplied to the levels needed for the logic circuits.

When both switches 21 and 22 are open, current from the electrical source may flow through capacitors 23 and 24 to a linear regulator. When switch 21 is closed and switch 22 is open, current from the source may flow through capacitor 24 to the linear regulator. When switch 22 is closed and switch 21 is open, current from the source may flow through capacitor 23 to the linear regulator.

The current stolen from the load should be at least 100 times smaller than the nominal current of the load in order to avoid a turn-on of the load unintentionally. This may be achieved by the reactance of the capacitor that is calculated by the formula $X_C=1/(2Pi*f*C)$. Pi may be a constant of 3.14159 . . . .

Since the system has a linear regulator, a designer may need to ensure that a voltage level of a divider between $X_C$ and $R_{load}$ is higher than the minimum $V_{load}$ needed for operation.

FIG. 1 is a diagram of a circuit 10 of a power stealing system for a two-speed AC motor. Terminals 11 and 12 may be connected to neutral and line terminals, respectively, of a line voltage of 120 to 240 volts AC. Terminals 11 and 12 may also be regarded as lines 11 and 12, respectively. Terminal 11 may be connected to a terminal 13 of a two-speed motor 16. Terminal 13 may be connected to a first end of a winding 17 and a first end of a winding 18. A second end of winding 17 may be connected to a terminal 14 of motor 16. A second end of winding 18 may be connected to a terminal 15 of motor 16. Terminal 14 may be connected to a first end of a switch 21. A second end of switch 21 may be connected to line 12. Terminal 15 may be connected to a first end of a switch 22. A second end of switch 22 may be connected to line 12. Switches 21 and 22 may be open, or closed and open, alternatively.

Terminal 14 maybe connected to a first end of a capacitor 23. A second end of capacitor 23 may be connected to an anode of a diode 26 and a cathode of a diode 27. A cathode of diode 26 may be connected to a cathode of a diode 28. An anode of diode 27 may be connected to an anode of a diode 29. An anode of diode 28 may be connected to a cathode of diode 29. A connection point of the anode of diode 28 and the cathode of diode 29 may be connected to line 12. A connection point of anodes of diodes 27 and 29 may be connected to a ground 30. A full-wave rectifier 25 may incorporate diodes 26, 27, 28 and 29.

Terminal 15 may be connected to a first end of a capacitor 24. A second end of capacitor 24 may be connected to an anode of a diode 31 and a cathode of a diode 32. A cathode of diode 31 may be connected to a cathode of a diode 33. An anode of diode 32 may be connected to an anode of a diode 34. An anode of diode 33 may be connected to a cathode of diode 34. A connection point of the anode of diode 33 and the cathode of diode 34 may be connected to line 12. A connection point of anodes of diodes 32 and 34 may be connected to ground 30. A full-wave rectifier 35 may incorporate diodes 31, 32, 33 and 34.

A connection point of the cathodes of diodes 26 and 28 may be connected, via a terminal or line 36, with the cathodes of diodes 31 and 33. A resistor 37 may have a first end connected to line 36. A second end of resistor 37 may be connected to a cathode of a Zener diode 38 and an anode of a diode 39. An anode of Zener diode 38 may be connected to ground 30. A cathode of diode 39 may be connected via a terminal or line 41 to a first end of a capacitor 42. Terminal 41 may be regarded as a Vcc terminal. An input of a circuit logic module 40 may be connected to line 41. Terminal 41 and line 41 may be regarded as the same item. An output may be a positive load voltage ($V_{LOAD}$) that may be connected to a first end of a load that may be represented by a resistor 44. A second end of the load (resistor 44) may be connected to ground 30 (i.e., a negative or zero side of the load voltage).

Further description of circuit 10 may be noted. Capacitors 23 and 24 may be class X2 rated capacitors. A current 53 may be a sum of current 51 and current 52 when switches 21 and 22 are open. Current 51 may flow through capacitor 23 to rectifier 25. Current 52 may flow through capacitor 24 to rectifier 35. Current 53 may flow from rectifiers 25 and 35 through resistor 37. Current 53 may be the same magnitude as that of current 51 when switch 21 is opened and switch 22 is closed. Current 53 maybe the same magnitude as that of current 52 when switch 21 is closed and switch 22 is open. Magnitudes of current 51 and current 52 may depend on the reactances of capacitor 23 and capacitor 24, respectively, according to a formula $Xc=1/(2Pi*f*C)$. The magnitudes of current 51 and current 52 need to be at least 100 times smaller than the nominal current of windings 17 and 18 of AC motor 16.

Voltage division between capacitor 23/capacitor 24 and $R_{LOAD}$ 44 should be higher than a minimum $V_{LOAD}$ needed to operate the logic circuits.

It may be noted that an amount of power at a terminal 55 connected to the second end of capacitor 23 should be different than an amount of power at a terminal 56 connected to the second end of capacitor 24 in order to allow stealing power from both motor windings. That may be regarded as a reason why full-bridge rectifiers 25 and 26 are needed.

Figure 2:
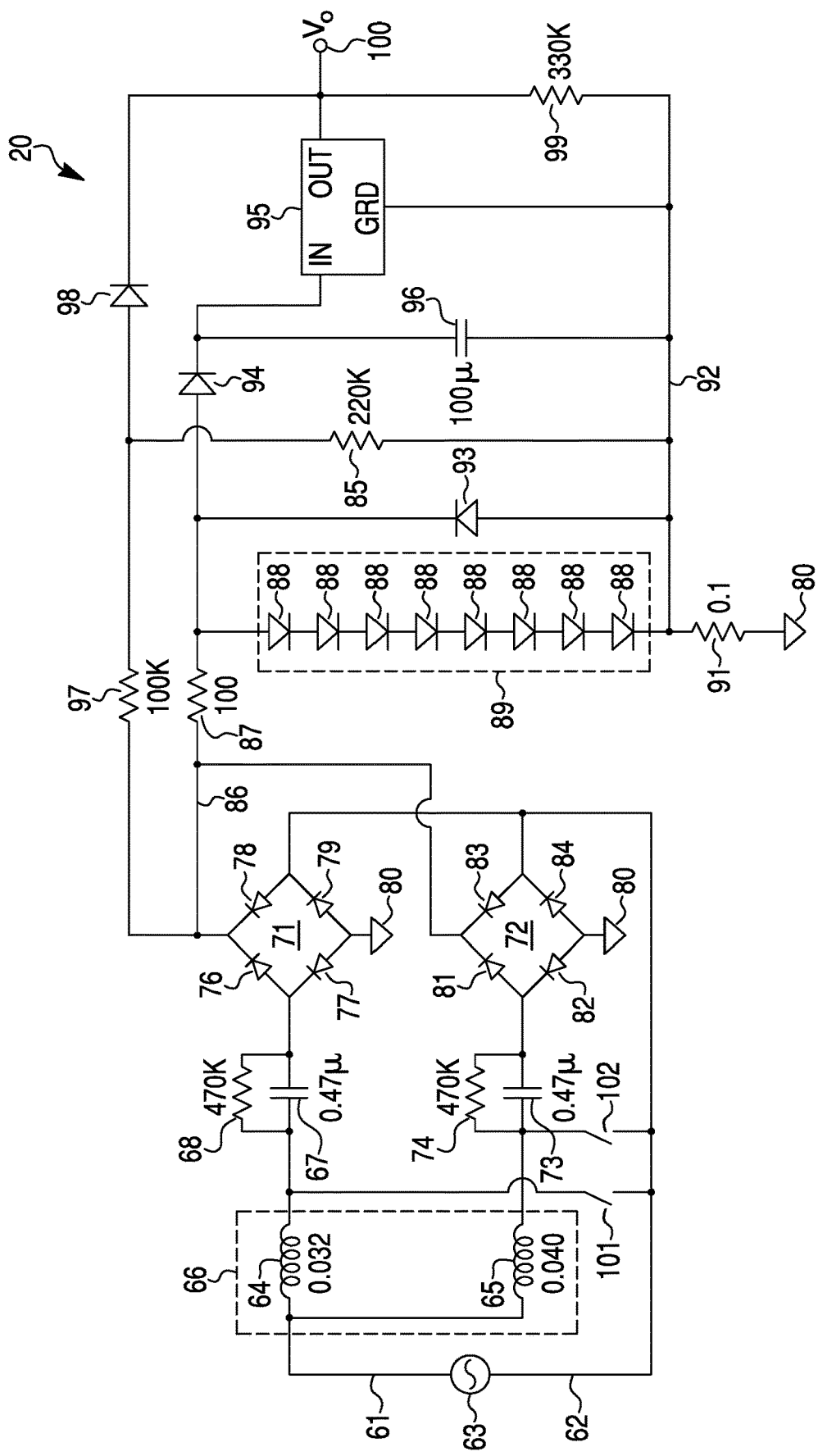
FIG. 2 is a diagram of another circuit of a power stealing AC motor.

FIG. 2 is a diagram of a circuit 20 that is similar to circuit 10 of FIG. 1 in terms of operation. Circuit 20 may likewise have a power stealing system associated with a two-speed AC motor 66.

An AC voltage source 63 may have an output on lines 61 and 62. Line 61 may be connected to a first end of a winding 64 and a first end of a winding 65. Winding 64 may have an inductance of 0.032 henry and winding 65 may have an inductance of 0.040 henry. Electric motor 66 may incorporate windings 64 and 65. A second end of winding 64 may be connected to a first end of a 0.47 uF capacitor 67 and a first end of a 470 k ohm resistor 68. A second end of winding 65 may be connected to a first end of a 0.47 uF capacitor 73 and a first end of a 470 k ohm resistor 74.

Second ends of capacitor 67 and resistor 68 may be connected to an anode of a diode 76 and a cathode of a diode 77. A cathode of diode 76 may be connected to a cathode of a diode 78. An anode of diode 78 may be connected to a cathode of a diode 79. An anode of diode 77 may be connected to an anode of diode 79, and these anodes may be connected to a ground 80. A fall-wave rectifier 71 may incorporate diodes 76, 77, 78 and 79.

The second ends of capacitor 73 and resistor 74 may be connected to an anode of a diode 81 and a cathode of a diode 82. A cathode of diode 81 may be connected to a cathode of a diode 83. An anode of diode 83 may be connected to a cathode of a diode 84. An anode of diode 82 may be connected to an anode of diode 84, and these anodes may be connected to ground 80. A full-wave rectifier 72 may incorporate diodes 81, 82, 83 and 84.

A connection of the anode of diode 78 with the cathode of diode 79 may be connected to line 62. A connection of the anode of diode 83 with the cathode of diode 84 may be connected to line 62. A connection of the cathode of diode 76 with the cathode of diode 79 may be connected to a line 86. A connection of the cathode of diode 81 with the cathode of diode 83 may be connected to line 86.

A 100 ohm resistor 87 may have a first end connected to line 86 and a second end connected to an anode of a first diode 88 of a series 89 of eight diodes 88 with an eighth diode having a cathode connected to a first end of a 0.1 ohm resistor 91. A second end of resistor 91 may be connected to ground 80. The first end of resistor 91 may be connected to a line 92. A diode 93 may have a cathode connected the second end of resistor 87 and an anode connected to line 92.

An anode of a diode 94 may be connected to the second end of resistor 94. A cathode of diode 94 may be connected to an input terminal of an integrated circuit (IC) chip 95. Chip 95 may be an LT1117-3.3 model that is a positive low dropout voltage regulator available from Linear Technology (LT™) Corporation. A first end of a 100 uF capacitor 96 may be connected to the cathode of diode 94. A second end of capacitor 96 may be connected to line 92. A ground terminal of chip 95 may be connected to line 92. A 100 k ohm resistor 97 may have a first end connected to line 86 and have a second end connected to an anode of a diode 98. A 220 k ohm resistor 85 may have a first end connected to the second end of resistor 97 and have a second end connected to line 92. A cathode of diode 98 may be connected to an output terminal of chip 95 (this circuit may act as AC detector with output at a diode 98 anode). A 330 ohm resistor 99 (this resistor can simulate a load circuit) may have a first end connected to the output terminal of chip 95 and have a second end connected to line 92. The output terminal of chip 95 may be a Vo terminal 100.

The diode used in circuit 20 may have a part number "1N4148", which should be available from various electronic parts vendors.

A first switch 101 may have a first terminal connected to the second end of winding 64, and have a second terminal connected to line 62. A second switch 102 may have a first terminal connected to the second end of winding 65, and have a second terminal connected to line 62. With switches 101 and 102 open, the current on line 86 may be equal to the sum of the currents into rectifier 71 and 72. With switch 101 open and switch 102 closed, the current on line 86 may be equal to the current going to rectifier 71. With switch 101 closed and switch 102 open, the current on line 86 may be equal to the current going to rectifier 72.

The parameter values of the components in the schematics of FIGS. 1 and 2 are examples but may be of other values.

Figure 3:
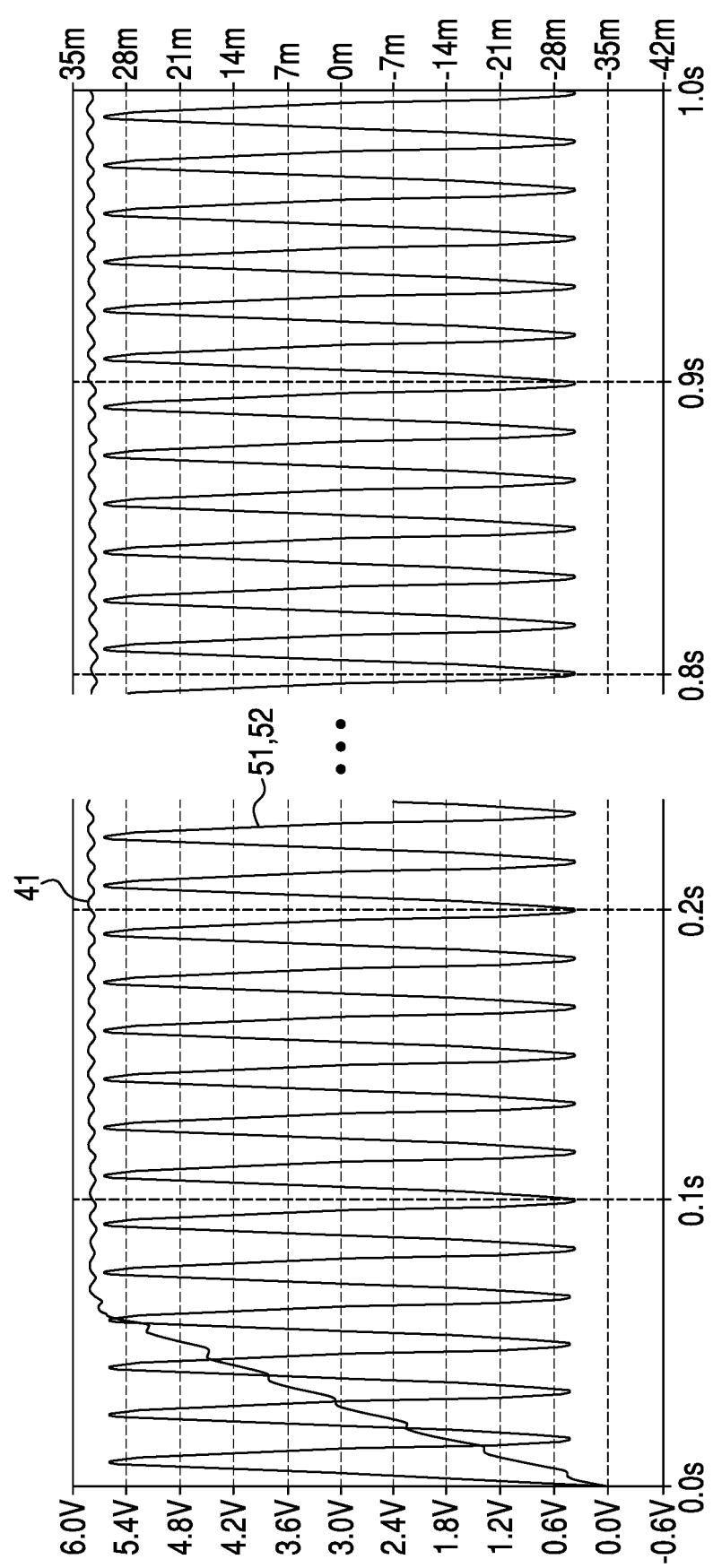
Figure 4:
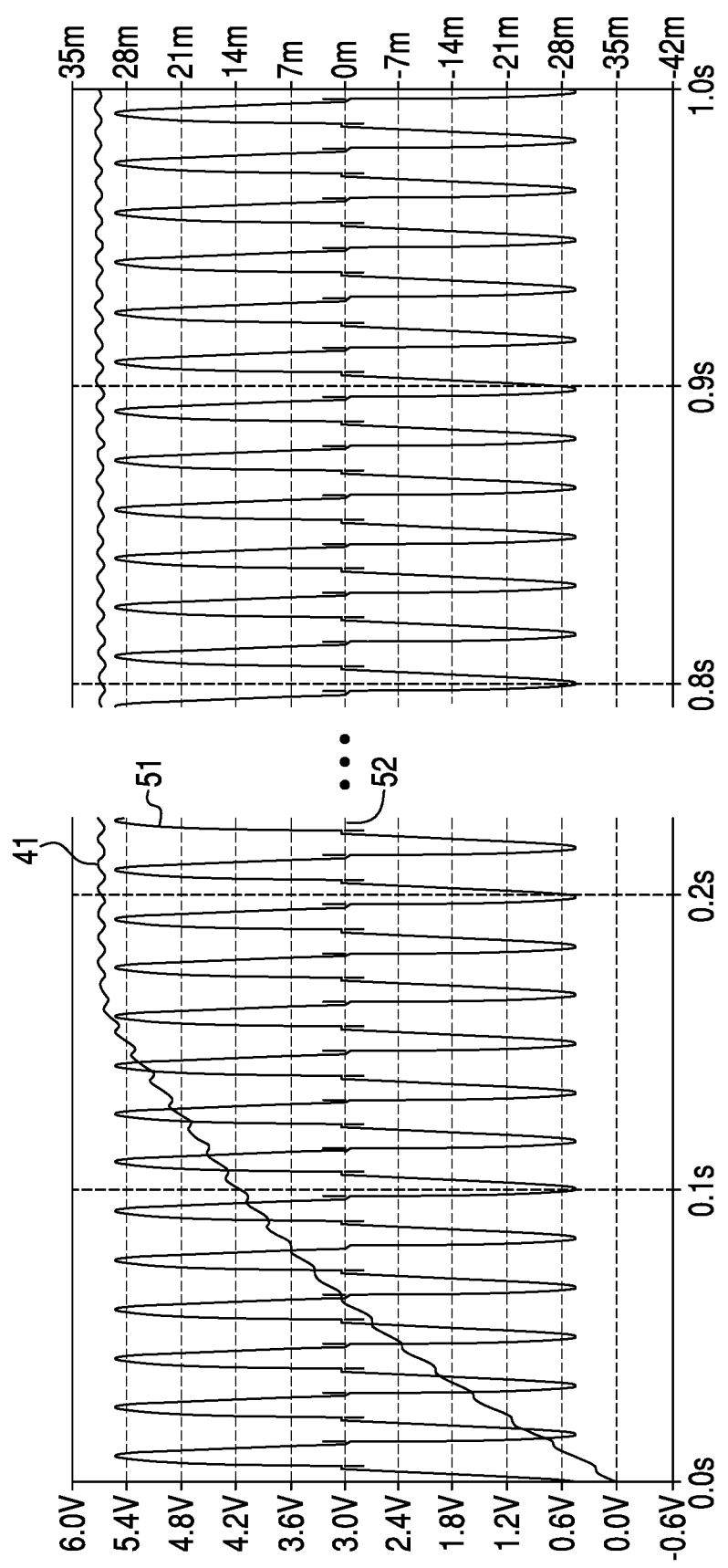

FIGS. 3, 4 and 5 illustrate circuit values on graphs of voltage (V) and current (m) versus time (s) at various points in the schematics for conditions 1, 2 and 3, respectively, as represented by the schematic in FIG. 1. The graphs would be the same if the description of the conditions were based on FIG. 2. Condition 1 may be represented when switches 21 and 22 are open. FIG. 3 shows the overlapping sine waveforms of currents 51 and 52 from capacitors 23 and 24, respectively, as represented by curves 51 and 52. A voltage out (Vcc) at point 41 may be illustrated by voltage curve 41 in the graph of FIG. 1.

Condition 2 may be represented when switch 21 is open and switch 22 is closed. FIG. 4 shows the waveforms of currents 51 and 52 from capacitors 23 and 24, respectively, as represented by curves 51 and 52. Curve 51 is a sine wave whereas curve 52 is shown to be at zero m (milliamp) with an exception of some small spikes deviating from the zero milliamp line. A voltage out (Vcc) at point 41 may be illustrated by voltage curve 41 in the graph of FIG. 4.

Condition 3 may be represented when switch 22 is open and switch 21 is closed. FIG. 5 shows the waveforms of currents 51 and 52 from capacitors 23 and 24, respectively, as represented by curves 51 and 52. Curve 52 is a sine wave whereas curve 51 is shown to be at zero m (milliamp) with an exception of some small spikes deviating from the zero milliamp line. A voltage out (Vcc) at point 41 may be illustrated by voltage curve 41 in the graph of FIG. 5.

To recap, a power stealing circuit may incorporate a first terminal for connection to a first end of a first winding of an electric load, a second terminal for connection to a first end of a second winding of the electric load, a first capacitive element having a first end connected to the first terminal, a second capacitive element having a first end connected to the second terminal, a first rectifier having an input terminal connected to a second end of the first capacitive element, a second rectifier having an input terminal connected to a second end of the second capacitive element, a resistive element having a first end connected to an output terminal of the first rectifier and connected an output terminal of the second rectifier, a diode having a first end connected to a second end of the resistive element, and a capacitive element having a first end connected to the first end of the diode.

The circuit may further incorporate a neutral power terminal for connection to a second end of the first winding end connection to a second end of the second winding, a line power terminal connected to a second input terminal of the first rectifier end connected to a second input terminal of the second rectifier, and a ground terminal connected to a second output terminal of the first rectifier, connected to a second output terminal of the second rectifier, connected to a second end of the diode, and connected to a second end of the capacitive element.

The circuit may further incorporate a voltage regulator having an input connected to the first end of the capacitive element, and having an output relative to the ground terminal.

The voltage regulator may provide power for a micro controller. The power provided for the micro controller may be stolen from power provided to an electric load.

The circuit may further incorporate a first switch having a first terminal connected to the first end of the first winding and having a second terminal connected to the line power terminal, and a second switch having a first terminal connected to the first end of the second winding and a second terminal connected to the line power terminal.

The electric load may be a multi-speed motor that operates a multi-speed evaporative cooling system or a multi-speed heating system.

The electric load may be a two-speed motor.

The two-speed motor may operate a two-speed evaporative cooling system.

Current taken from the first or second winding to the first rectifier or second rectifier may be less than one percent of current in the winding.

Current taken from the first or second winding to the first rectifier or second rectifier may be less than one-hundred percent or ten percent of current in the winding.

Current taken from the first or second winding to the first rectifier or second rectifier may be less than the current in the respective winding.

An approach of power stealing from an electric load, may incorporate connecting a first end of a first winding to a first terminal of an AC power supply, connecting a first end of a second winding to the first terminal of the AC power supply, connecting a first end of a first capacitor to a second end of the first winding, connecting a second end of the capacitor to a first terminal of a first rectifier, connecting a first end of a second capacitor to a second end of the second winding, connecting a second end of the second capacitor to a first terminal of a second rectifier, connecting a first end of a resistor to a second terminal of the first rectifier and to a second terminal of the second rectifier, connecting a Zener diode to a second end of the resistor, and connecting a filter capacitor to the Zener diode.

Current may be taken from the first and second windings by the first and second capacitors and provided to the first and second rectifiers, respectively. The current may be rectified and output from the first and second rectifiers to and through the resistor to the filter capacitor. The current from the filter capacitor may be used to power electrical components, electronics and/or micro-electronics.

A maximum amount of current output from the first and second rectifiers may be less than one, ten, fifty or one-hundred percent of current flowing through the first and second windings, respectively.

The first and second windings may be situated in a two-speed AC electric motor.

The two-speed AC electric motor may drive an evaporative cooling system.

A power stealing system may incorporate a first electrical load, a capacitive element having an input connected to the first electrical load, a rectifier having an input connected to an output of the capacitive element, and a voltage regulator having an input connected to an output of the rectifier and having an output for connection to a second electrical load.

An amount of current capable of flowing through the capacitive element may be between less than one-tenth percent or less than one-hundred percent of current flowing through the first electrical load.

The first electrical load may be a first winding of an AC motor.

The AC motor may drive an evaporative cooling apparatus.

The voltage regulator may incorporate a resistive element having an input connected to the output of the rectifier, a diode connected to an output of the rectifier, and a capacitive filter connected to the output of the rectifier.

The system may further incorporate a third electrical load, a second capacitive element having an input connected to the third electrical load, and a second rectifier having an input connected to an output of the second capacitive element. The voltage regulator may have the input connected to an output of the second rectifier.

The third electrical load may be a second winding of the AC motor.

The first and second windings may be a basis of the AC motor having two speeds.

The voltage converter may incorporate a step-down DC converter for providing the power to electronics configured to control the motor and/or the evaporative cooling apparatus.

Any publication or patent document noted herein is hereby incorporated by reference to the same extent as if each publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A power stealing circuit comprising:
   a first terminal for connection to a first end of a first winding of an electric load;
   a second terminal for connection to a first end of a second winding of the electric load;
   a first capacitive element having a first end connected to the first terminal;
   a second capacitive element having a first end connected to the second terminal;
   a first rectifier having an input terminal connected to a second end of the first capacitive element;
   a second rectifier having an input terminal connected to a second end of the second capacitive element;
   a resistive element having a first end connected to an output terminal of the first rectifier and connected an output terminal of the second rectifier;
   a diode having a first end connected to a second end of the resistive element; and
   a third capacitive element having a first end connected to the first end of the diode.

2. The circuit of claim 1, further comprising:
   a neutral power terminal for connection to a second end of the first winding end connection to a second end of the second winding;
   a line power terminal connected to a second input terminal of the first rectifier end connected to a second input terminal of the second rectifier; and
   a ground terminal connected to a second output terminal of the first rectifier, connected to a second output terminal of the second rectifier, connected to a second end of the diode, and connected to a second end of the third capacitive element.

3. The circuit of claim 2, further comprising a voltage regulator having an input connected to the first end of the third capacitive element, and having an output relative to the ground terminal.

4. The circuit of claim 3, wherein:
   the voltage regulator provides power for a micro controller; and
   the power provided for the micro controller is stolen from power provided to an electric load.

5. The circuit of claim 2, further comprising:
   a first switch having a first terminal connected to the first end of the first winding and having a second terminal connected to the line power terminal; and
   a second switch having a first terminal connected to the first end of the second winding and a second terminal connected to the line power terminal.

6. The system of claim 4, wherein the electric load is a multi-speed motor.

7. The system of claim 6, wherein the multi-speed motor operates a multi-speed evaporative cooling system or heating system.

8. The system of claim 1, wherein current taken from the first or second winding to the first rectifier or second rectifier is less than one percent of current in the winding.

9. A method of power stealing from an electric load, comprising:
   connecting a first end of a first winding to a first terminal of an AC power supply, a first end of a second winding to the first terminal of the AC power supply, a first end of a first capacitor to a second end of the first winding, a second end of the first capacitor to a first terminal of a first rectifier, a first end of a second capacitor to a second end of the second winding, a second end of the second capacitor to a first terminal of a second rectifier, a first end of a resistor to a second terminal of the first rectifier and to a second terminal of the second rectifier, a diode to a second end of the resistor, and a third capacitor to the diode; and
   wherein:
   current is taken from the first or second windings by the first capacitor or second capacitor and provided to the first rectifier or second rectifier, respectively;
   the current is rectified and output from the first rectifier or second rectifier to and through the resistor to the third capacitor; and
   current from the third capacitor is usable to power electronics or electrical components.

10. The method of claim 9, wherein a maximum amount of current output from the first rectifier and a second rectifier is less than one percent of current flowing through the first and second windings, respectively.

11. The method of claim 10, wherein the first and second windings are situated in a two-speed AC electric motor.

12. The method of claim 11, wherein the two-speed AC electric motor drives an evaporative cooling system.

13. A power stealing system comprising:
    a first electrical load;
    a first capacitive element having a first terminal, and a second terminal separate from the first terminal, wherein the first terminal is connected to the first electrical load;
    a first rectifier having an input connected to the second terminal of the first capacitive element; and
    a voltage regulator having an input connected to an output of the first rectifier and having an output for connection to a second electrical load; and
    wherein the power stealing system is configured such that a first amount of current flowing through the first capacitive element from the first electrical load is less than a second amount of current flowing through the first electrical load.

14. The system of claim 13, wherein the first electrical load is a first winding of an AC motor.

15. The system of claim 14, wherein the AC motor drives an evaporative cooling apparatus.

16. The system of claim 13, wherein the voltage regulator comprises:
    a resistive element having an input connected to the output of the first rectifier;
    a diode connected to an output of the resistive element; and
    a capacitive filter connected to the diode.

17. The system of claim 13, further comprising:
    a third electrical load;
    a second capacitive element having an input connected to the third electrical load; and
    a second rectifier having an input connected to an output of the second capacitive element; and
    wherein the voltage regulator has the input connected to an output of the second rectifier.

18. The system of claim 17,
    wherein the first electrical load is a first winding of an AC motor, and
    wherein the third electrical load is a second winding of the AC motor.

19. The system of claim 18, wherein the first and second windings are a basis of the AC motor having two speeds.

20. The system of claim 17, wherein the power stealing system comprises a voltage converter configured as a step-down DC converter for providing power to electronics configured to control the motor or the evaporative cooling apparatus.

\* \* \* \* \*